(12) United States Patent
Swarts et al.

(10) Patent No.: US 11,618,611 B2
(45) Date of Patent: Apr. 4, 2023

(54) COLLAPSIBLE FOOD CONTAINER

(71) Applicant: Stojo Products Inc., Brooklyn, NY (US)

(72) Inventors: Jurrien Swarts, Brooklyn, NY (US); Richard Smiedt, Santa Monica, CA (US)

(*) Notice: Subject to any disclaimer, the term of this patent is extended or adjusted under 35 U.S.C. 154(b) by 0 days.

(21) Appl. No.: 17/167,324

(22) Filed: Feb. 4, 2021

(65) Prior Publication Data

US 2021/0237933 A1 Aug. 5, 2021

Related U.S. Application Data

(60) Provisional application No. 62/969,728, filed on Feb. 4, 2020.

(51) Int. Cl.
*B65D 21/08* (2006.01)
*B65D 43/02* (2006.01)

(52) U.S. Cl.
CPC ....... *B65D 21/086* (2013.01); *B65D 43/0212* (2013.01); *B65D 2543/00092* (2013.01); *B65D 2543/0099* (2013.01)

(58) Field of Classification Search
CPC .............. B65D 21/086; B65D 43/0212; B65D 2543/0099
See application file for complete search history.

(56) References Cited

U.S. PATENT DOCUMENTS

| | | | |
|---|---|---|---|
| 2005/0127073 A1* | 6/2005 | Kusuma | B65D 21/086 220/6 |
| 2015/0136786 A1* | 5/2015 | Lonner | B65D 21/086 220/529 |
| 2021/0061525 A1* | 3/2021 | Chapman | B65D 43/0214 |

* cited by examiner

*Primary Examiner* — Jeffrey R Allen
(74) *Attorney, Agent, or Firm* — Warshaw Burstein, LLP (57) ABSTRACT

A collapsible food container, comprising a collapsible container and a lid assembly, the collapsible container including an upper portion, a lower portion, and a seating wall, the seating wall coupled to a first end of the upper portion and the lower portion coupled to a second end of the upper portion opposite the first end, the upper portion being collapsible as to transition the collapsible container between an expanded state and a collapsed state, the lid assembly including a rigid collar and a rigid lid, the rigid collar removably coupled to the seating wall of the collapsible container and the rigid lid removably coupling to the rigid collar.

11 Claims, 7 Drawing Sheets

COLLAPSIBLE FOOD CONTAINER

FIELD

This application relates to a collapsible food container, and more specifically to a collapsible food container with a collapsible container and a lid assembly that includes a rigid collar and a rigid lid.

CROSS-REFERENCE TO RELATED APPLICATION

This application claims priority to U.S. provisional Application No. 62/969,728, filed Feb. 4, 2020, which is incorporated herein by reference in its entirety.

BACKGROUND

Consumer desire a reusable food storage container that helps to prevent the use of single-use containers where possible. There are three main types of food containers available in the market today. The first type are disposable food containers that are typically discarded following the consumption of food contained therein. These containers contribute to the creation of waste. The second type are reusable containers which. While reusable containers help to alleviate the waste created by disposable containers, they also require the consumer to carry a large container following consumption of the food contained therein. Also, reusable containers take up valuable shelf space while being stored within the home. Lastly, the third type are collapsible containers whose components are permanently bonded together during production. These collapsible containers will eventually develop weak points that can easily break. Moreover, since the components are permanently bonded together, they cannot be recycled or disposed of responsibly after use.

What is needed is a reusable food container which is collapsible, allowing for ease of use while on the go and efficient storage within the home, and whose components are separable as to extend the lifetime of the food container and to allow for recycling or responsible disposal after use.

SUMMARY

In an effort to addresses the above-described needs, a collapsible food container is disclosed. In some embodiments, the collapsible food container is comprised of a collapsible container and a lid assembly. The collapsible container including an upper portion, a lower portion, and a seating wall. The seating wall is coupled to a first end of the upper portion and the lower portion coupled to a second end of the upper portion opposite the first end. The upper portion being collapsible as to transition the collapsible container between an expanded state in which the collapsible container defines an inner space and a collapsed state in which the lower portion, the upper portion, and the seating wall are adjacent to one another. The lid assembly including a rigid collar and a rigid lid, the rigid collar removably coupled to the seating wall of the collapsible container and the rigid lid removably coupling to the rigid collar.

In some embodiments, a method for providing a collapsible food container is disclosed. The method for providing a collapsible food container comprising providing a collapsible container and providing a lid assembly. The collapsible container including an upper portion, a lower portion, and a seating wall. The seating wall coupled to a first end of the upper portion and the lower portion coupled to a second end of the upper portion opposite the first end. The upper portion being collapsible as to transition the collapsible container between an expanded state in which the collapsible container defines an inner space and a collapsed state in which the lower portion, the upper portion, and the seating wall are adjacent to one another. The lid assembly including a rigid collar and a rigid lid, the rigid collar removably coupled to the seating wall of the collapsible container and the rigid lid removably coupling to the rigid collar.

BRIEF DESCRIPTION OF THE DRAWINGS

The drawings described below are for illustrative purposes only and are not necessarily drawn to scale. The drawings are not intended to limit the scope of the disclosure in any way. Wherever possible, the same or like reference numbers are used throughout the drawings to refer to the same or like parts.

DETAILED DESCRIPTION

As mentioned above, this application relates to a collapsible food container.

Figure 1:
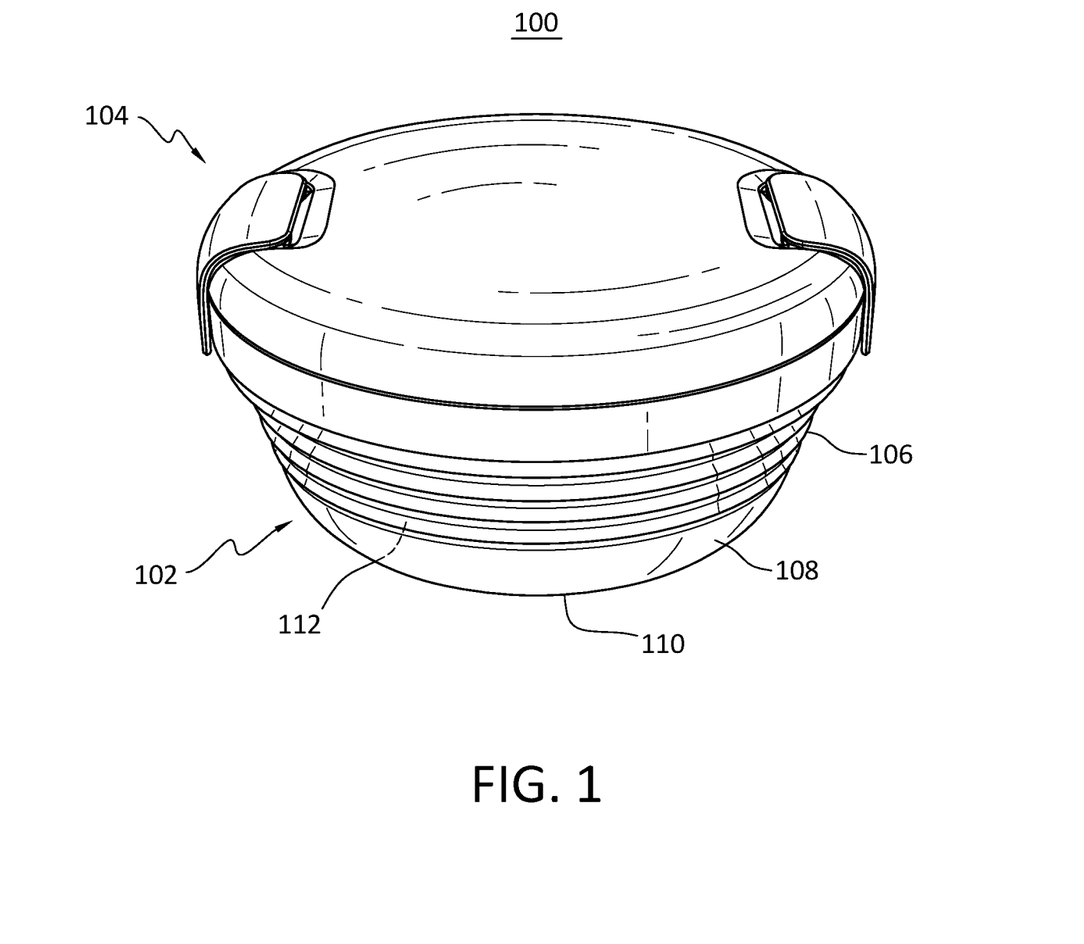
FIG. 1 is a top perspective view of a collapsible food container in an expanded state according to an embodiment disclosed herein.

FIG. 1 is a top perspective view of a collapsible food container 100 in an expanded state according to an embodiment disclosed herein. The embodiment disclosed in FIG. 1 is of a collapsible food container 100 with a cylindrical bowl shape. However, the collapsible food container 100 may have other shapes while remaining with the scope of the present disclosure, including rectangular, square, oval, and triangular shapes.

As shown in FIG. 1, the collapsible food container 100 may include a collapsible container 102 and a lid assembly 104. The collapsible container 102 may include an upper portion 106 and a lower portion 108. The combination of the upper and lower portions 106, 108 may have a generally tapered shape. The tapered shape allows the upper and lower portions 106, 108 to effectively collapse upward to an area adjacent to the lid assembly 104.

The lower portion 108 may include a flat bottom portion 110 that allows the collapsible food container 100 to sit upright on a flat surface.

The collapsible container 102 may comprise any material known to one of ordinary skill in the art that is flexible, waterproof, and microwave safe, including silicone rubber and synthetic elastomer. Moreover, these materials may be treated to ensure that they are food safe.

The lid assembly 104 may be removably coupled to the upper portion 106 of the collapsible container 102. The lid assembly 104 provides access to an inner space 112 (not shown) defined within the collapsible container 102. The lid assembly 104 may have an identical shape or a similar shape to the collapsible container to effectively couple with the collapsible container 102 and control access to the inner space 112.

Figure 2:
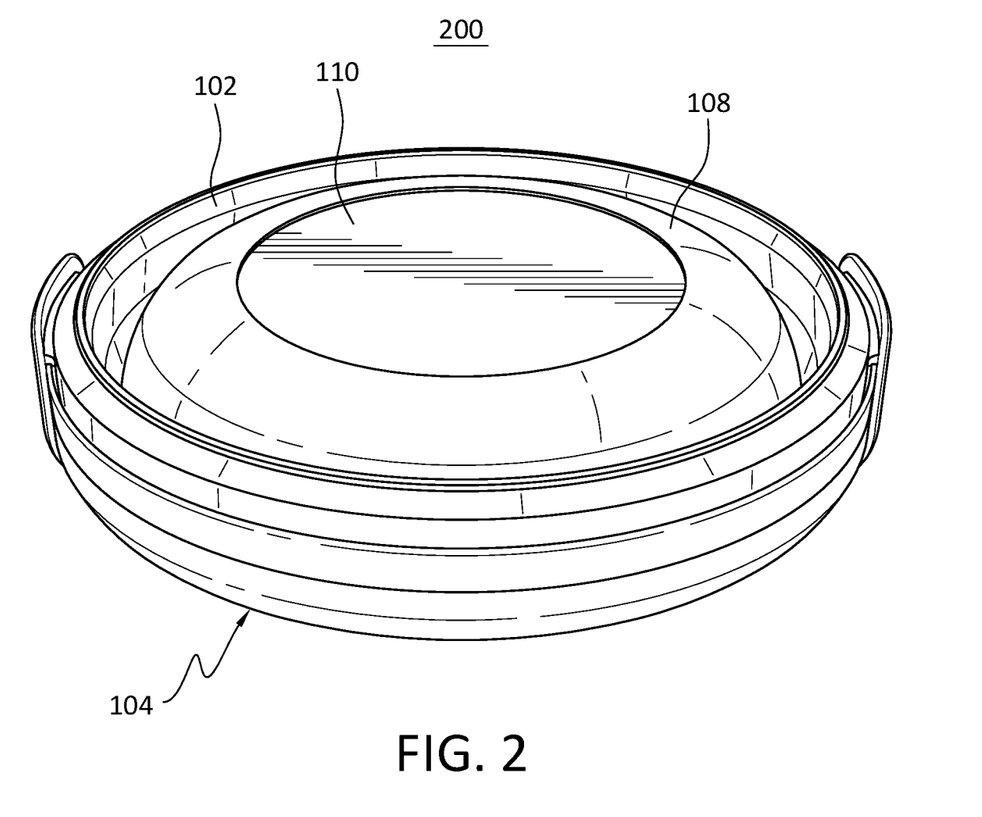
FIG. 2 is a bottom perspective view of a collapsible food container in a collapsed state according to an embodiment disclosed herein.

FIG. 2 is a bottom perspective view 200 of a collapsible food container 100 in a collapsed state according to an embodiment disclosed herein. While the collapsible container 102 is in a collapsed state, the upper portion 106 (not shown) and the lower portion 108 may each collapse upward towards the lid assembly 104. Specifically, the upper portion 106 may collapse to an area adjacent to the lid assembly 104, while the lower portion 108 may collapse entirely into the upper portion 106.

The proportions of the upper and lower portions 106, 108 are such that the lower portion 108 is fully enveloped within the upper portion 106 when the collapsible container 102 is in the collapsed state.

Figure 3:
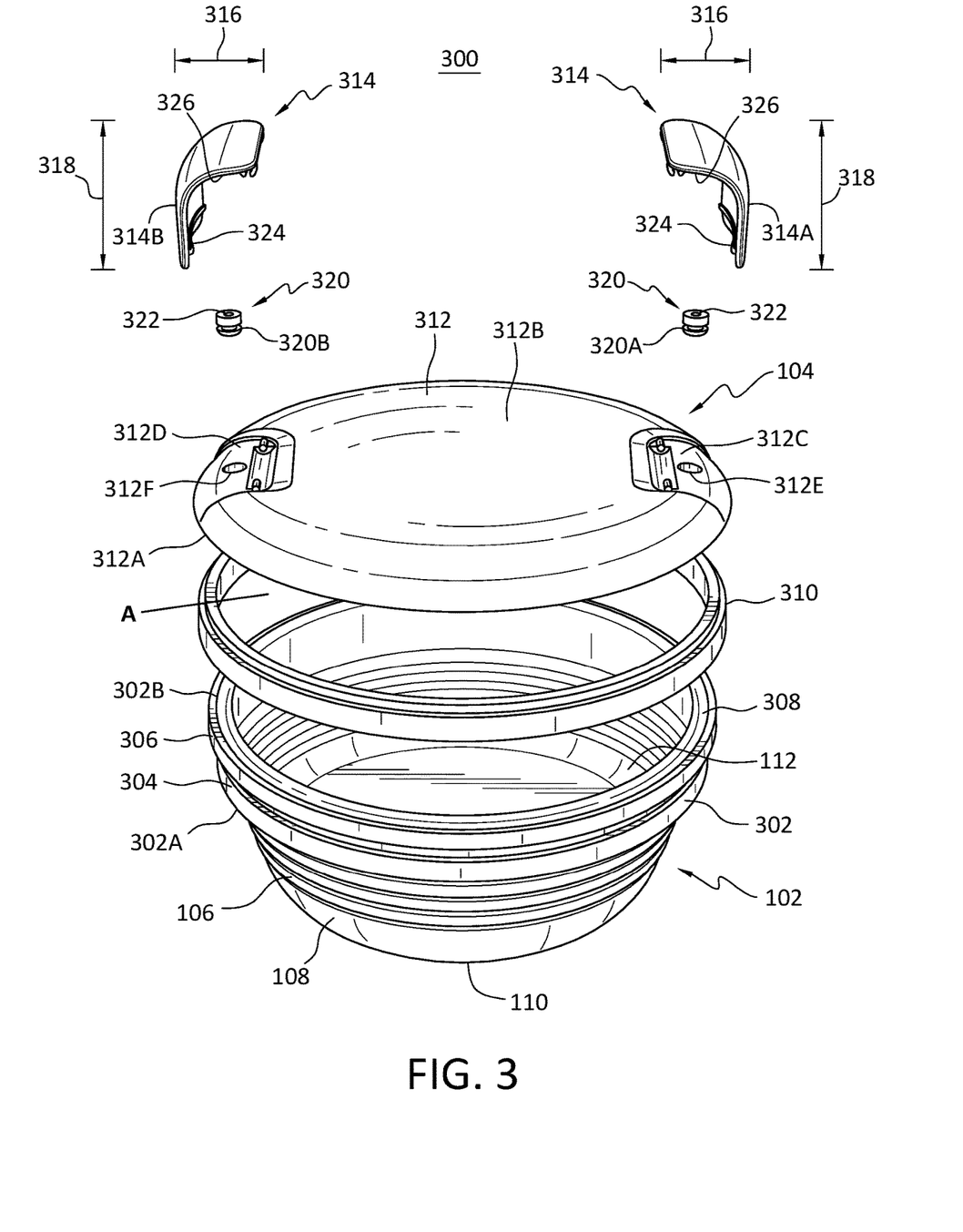
FIG. 3 is an exploded view of a collapsible food container in an expanded state according to an embodiment disclosed herein.

FIG. 3 is an exploded view 300 of a collapsible food container 100 in an expanded state according to an embodiment disclosed herein. The collapsible container 102 may include a seating wall 302 extending from the upper portion 106.

A lower retaining ridge 304 may extend outward from an intersection of the upper portion 106 and a first perimeter edge 302A of the seating wall 302.

An upper retaining ridge 306 may extend outward from a second perimeter edge 302B of the seating wall 302, the second perimeter edge 302B positioned opposite the first perimeter edge 302A. The second perimeter edge 302B defines an opening 308 that provides access to the inner space 112 defined within the collapsible container 102.

As with the upper and lower portions 106, 108, the seating wall 302, the lower retaining ridge 304, and the upper retaining ridge 306 may each be comprised of any material known to a person of ordinary skill in the art that is flexible, waterproof and microwave safe, these materials including silicone rubber and synthetic elastomer. Moreover, these materials may be treated to make them food safe.

Returning to FIG. 3, the lid assembly 104 may include a rigid collar 310 and a rigid lid 312. In the embodiment shown in FIG. 3, the rigid collar 310 is cylindrically shaped with an inner circumference that is generally equal to an outer circumference of the seating wall 302. However, the rigid collar 310 may have any other shape that generally matches the shape of the seating wall 302 while remaining within the disclosed embodiment's scope, the other shapes, including rectangular, square, oval, and triangular shapes.

When set in place on the collapsible container 102, the rigid collar 310 is positioned in-between the lower and upper retaining ridges 304, 306, and rests against the seating wall 302. The flexibility of the seating wall 302 allows for the insertion and removal of the rigid collar 310 over the lower and upper retaining ridges 304, 306. The lower and upper retaining ridges 304, 306, while flexible, have a sufficient thickness to securely support and hold in place the rigid collar 310 while collapsible container 102 transitions between the expanded state and the collapsed state.

In the embodiment shown in FIG. 3, the rigid lid 312 is cylindrically shaped with an inner circumference that is generally equal to the circumference of the upper retaining ridge 306. However, the rigid lid 312 may have any other shape that matches the rigid collar 310 while remaining within the disclosed embodiments' scope, the other shapes, including rectangular, square, oval, and triangular shapes.

A perimeter edge 312A of the rigid lid 312 may rest against the upper retaining ridge 306 when positioned over the opening 308 and secured to the collapsible container 102. The rigid lid 312 may be made from any rigid material known to one of ordinary skill in the art that is rigid and microwave safe, this rigid material including polyurethane and plastic.

The rigid lid 312 may include a pair of latches 314 positioned adjacent to the perimeter edge 312A on opposite sides of the rigid lid 312. Specifically, a first latch 314A may be rotatably coupled to an outer surface 312B of the rigid lid 312 at a first coupling position 312C adjacent to the perimeter edge 312A.

A second latch 314B may be rotatably coupled to the outer surface 312B at a second coupling position 312D adjacent to the perimeter edge 312A. The second coupling position 312D opposite the first coupling position 312C on the outer surface 312B of the rigid lid 312.

While the embodiment shown in FIG. 1 includes a single pair of latches 314, the rigid lid 312 may include more than one pair of latches 314, each of the pairs of latches 314 positioned at equal distances from one another on the rigid lid 312.

Each of the pair of latches 314 may be L-shaped with a first leg 316 and a second leg 318. The first leg 316 may be proportioned to extend along the outer surface 312B of the rigid lid 312 from the first and second coupling positions 312C, 312D to the perimeter edge 312A. The second leg 318 may be proportioned to extend downward towards the collapsible container 102 from the perimeter edge 312A of the rigid lid 312 to the rigid collar 310. The second leg 318 may removably couple to the rigid collar 310 and thereby securing the rigid lid 312 to the collapsible container 102.

The lid assembly 104 may further include compression valves 320 embedded within the outer surface 312B of the rigid lid 312 and positioned under each of the pair of latches 314. Specifically, a first compression valve 320A may be embedded within a first through-hole 312E in the rigid lid 312 and positioned underneath the first leg 316 of the first latch 314A. A second compression valve 320B may be embedded within a second through-hole 312F in the rigid lid 312 and positioned underneath the first leg 316 of the second latch 314B. The compression valves 320 may be comprised of any flexible and water-resistant material known to one of ordinary skill in the art capable of expansion and contraction within the first and second through-holes 312E, 312F, including rubber.

In embodiments in which there are more than one pair of latches 314, compression valves 320 are embedded within the outer surface 312B of the rigid lid 312 and positioned under each of the more than one pair of latches 314.

Each of the compression valves 320 may be pressed down towards a corresponding one of the first and second through-holes 312E, 312F as a result of rotating each of the pair of latched 314 downward towards the collapsible container 102. Once each of the pair of latches 314 is coupled to the rigid collar 310, an airtight seal at each of the first and second through-holes 312E, 312F is created. Conversely, once any one of the pair of latches 314 is de-coupled from the rigid collar 310, the airtight seal at a corresponding one of the first and second through-holes 312E, 312F is broken, and air may flow freely through the compression valve 320.

While either of the pair of latches 314 is de-coupled, the compression valves 320 allow air to enter and exit the inner space 112 defined within the collapsible container 102. Specifically, each of the compression valves 320 may include a hole 322 running through each of the compression valves 320. The hole 322 in each of the compression valves 320 allows air to enter and exit the inner space 112 through the compression valves 320.

This free airflow provides for the effective compression and expansion of the collapsible container 102 between the expanded and collapsed states. Moreover, the pair of latches 314 may be de-coupled to allow the free flow of air through the hole 322 in each of the compression valves 320 while using the collapsible food container 100 in a microwave to heat food within the inner space 112 of the collapsible container 102.

Each of the pair of latches 314 may be removable from the rigid lid 312. Similarly, each of the compression valves 320 may be removable from the rigid lid 312. The removal of the pair of latched 314 and the compression valves 320 provides for effective cleaning of the lid assembly 104. Once cleaned, the pair of latches 314 and the compression valves 320 may be re-attached to the rigid lid 312.

Figure 4A:
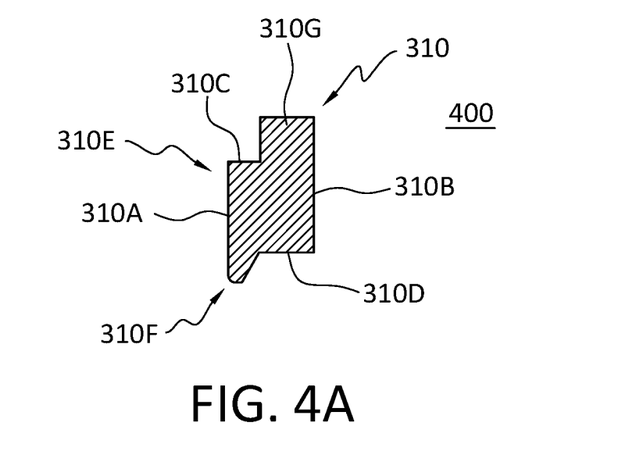
FIG. 4A is a cross sectional view of a rigid collar along line A in FIG. 3 according to an embodiment disclosed herein.

FIG. 4A is a cross sectional view 400 of a rigid collar 310 along line A in FIG. 3 according to an embodiment disclosed herein. The rigid collar 310 may include an outer surface 310A and an inner surface 310B, the inner surface 310B designed to sit against the seating wall 302 (not shown). The rigid collar 310 may include an upper ridge 310C along an upper perimeter 310E of the outer surface 310A. The upper ridge 310C is defined by an upper wall 310G running along the full upper perimeter 310E. The rigid collar 310 may further include a lower channel 310D running through a lower perimeter 310F of the rigid collar 310 proximate the inner surface 310B.

Figure 4B:
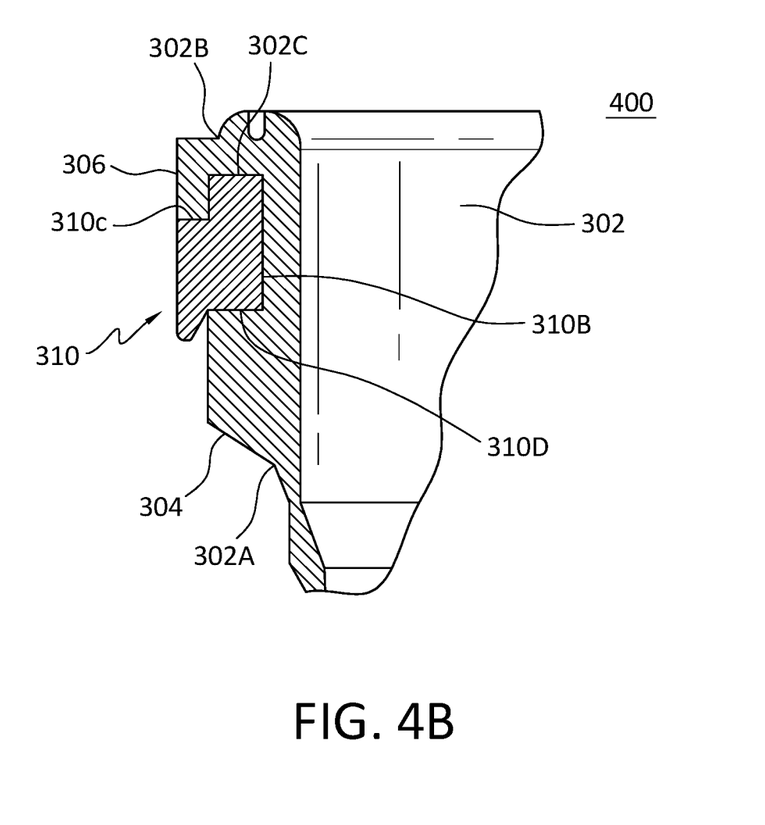
FIG. 4B is a cross sectional view of the rigid collar along line A in FIG. 3 positioned on a collapsible container according to an embodiment disclosed herein.

FIG. 4B is a cross sectional view 400 of the rigid collar 310 positioned on a collapsible food container 100 along line A in FIG. 3 according to an embodiment disclosed herein. While positioned on the seating wall 302, the inner surface 310B of the rigid collar 310 sits against the seating wall 302. Also, the upper retaining ridge 306 of the seating wall 302 sits within the upper ridge 310C, and the lower retaining ridge 304 sits within the lower channel 310D. The upper wall 310G of the rigid collar 310 is embedded within a seating wall channel 302C defined between the upper retaining ridge 306 and the inner surface 310B of the seating wall 302. The interface between the lower and upper retaining ridges 304, 306 and the rigid collar 310 helps secure the rigid collar 310 to the collapsible container 102.

Returning to FIG. 3, each of the pair of latches 314 may include a clip 324 that interfaces with the lower perimeter 310F on the rigid collar 310 to secure the lid assembly 104 to the collapsible container 102. Specifically, the clip 324 on each of the pair of latches 314 extend from an inner surface 326 of each of the latches 314. The clip 324 presses against the lower perimeter 310F to pull the lid assembly 104 down towards the collapsible container 102. Once sufficiently pulled down, the clip 324 on each of the pair of latches 314 sits against the lower perimeter 310F of the rigid collar 310 to keep the lid assembly 104 secured to the collapsible container 102. By pulling the rigid lid 312 down towards the collapsible container 102 and securing the pair of latches 314 to the rigid collar 310, an airtight seal is created between the perimeter edge 312A and an outer surface of the upper retaining ridge 306.

Figure 4C:
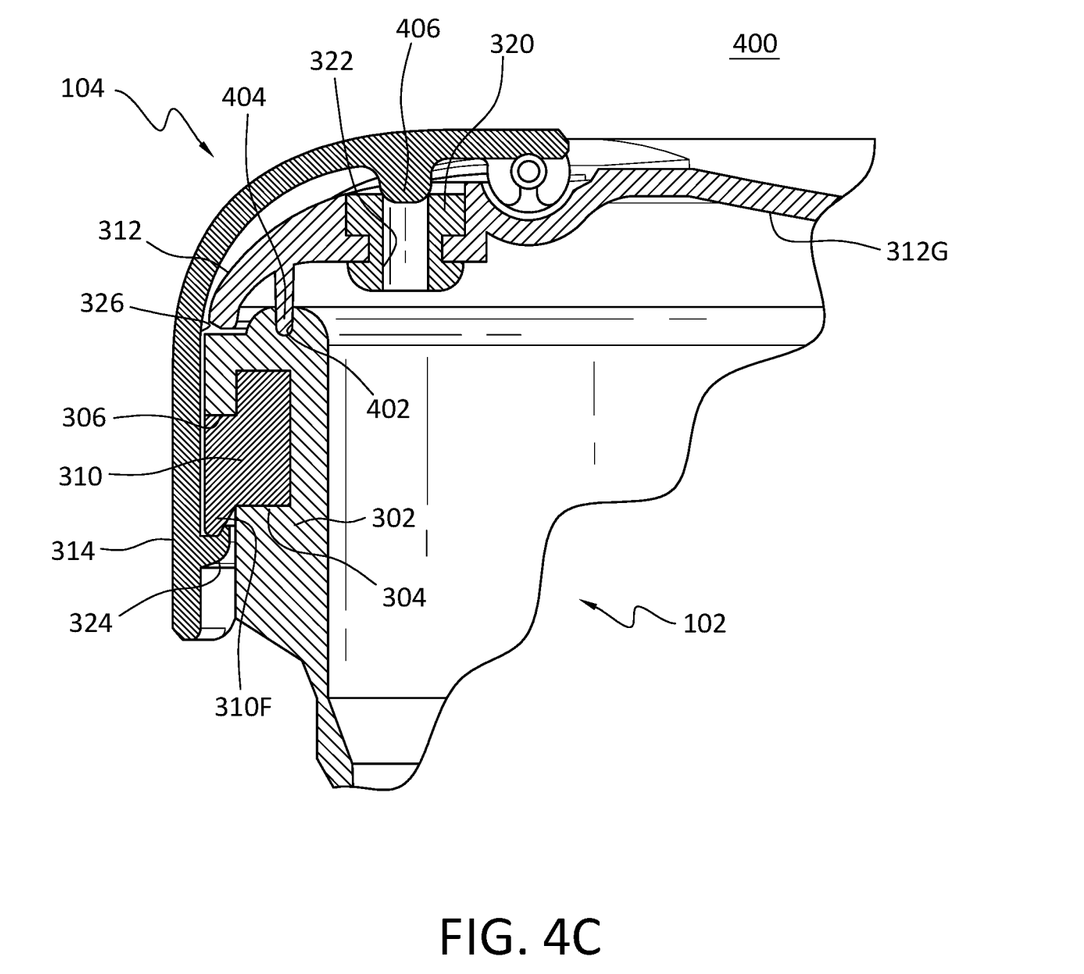
FIG. 4C is a cross sectional view 400 of the lid assembly 104 secured to the collapsible food container 100 along line A in FIG. 3 according to an embodiment disclosed herein.

FIG. 4C is a cross sectional view 400 of the lid assembly 104 secured to the collapsible food container 100 along line A in FIG. 3 according to an embodiment disclosed herein. The upper retaining ridge 306 may include an embossed channel 402 running along the full circumference of the upper retaining ridge 306. A raised profile 404 extends from an inner surface 312G of the rigid lid 312, the inner surface 312G opposite the outer surface 312B of the rigid lid 312. The lid assembly 104 is secured to the collapsible container 102 once the clip 324 on each of the pair of latches 314 is pressed against the lower perimeter 310F of the rigid collar 310. While the lid assembly 104 is secured to the collapsible container 102, the raised profile 404 fits within the embossed channel 402 to create a leak-proof seal of the inner space 112 defined within the collapsible container 102.

Each of the plurality of latches 314 includes a circular protrusion 406 that extends from its inner surface 312G. The circular protrusion 406 on the inner surface 312G of each of the pair of latches 314 is positioned to align with the hole 322 in each of the compression valves 320 once it is closed. The circular protrusion 406 presses against a corresponding one of the compression valves 320 to fully cover the hole 322 and create an airtight seal once the corresponding one of the pair of latches 314 is secured to the rigid collar 310.

Figure 5:
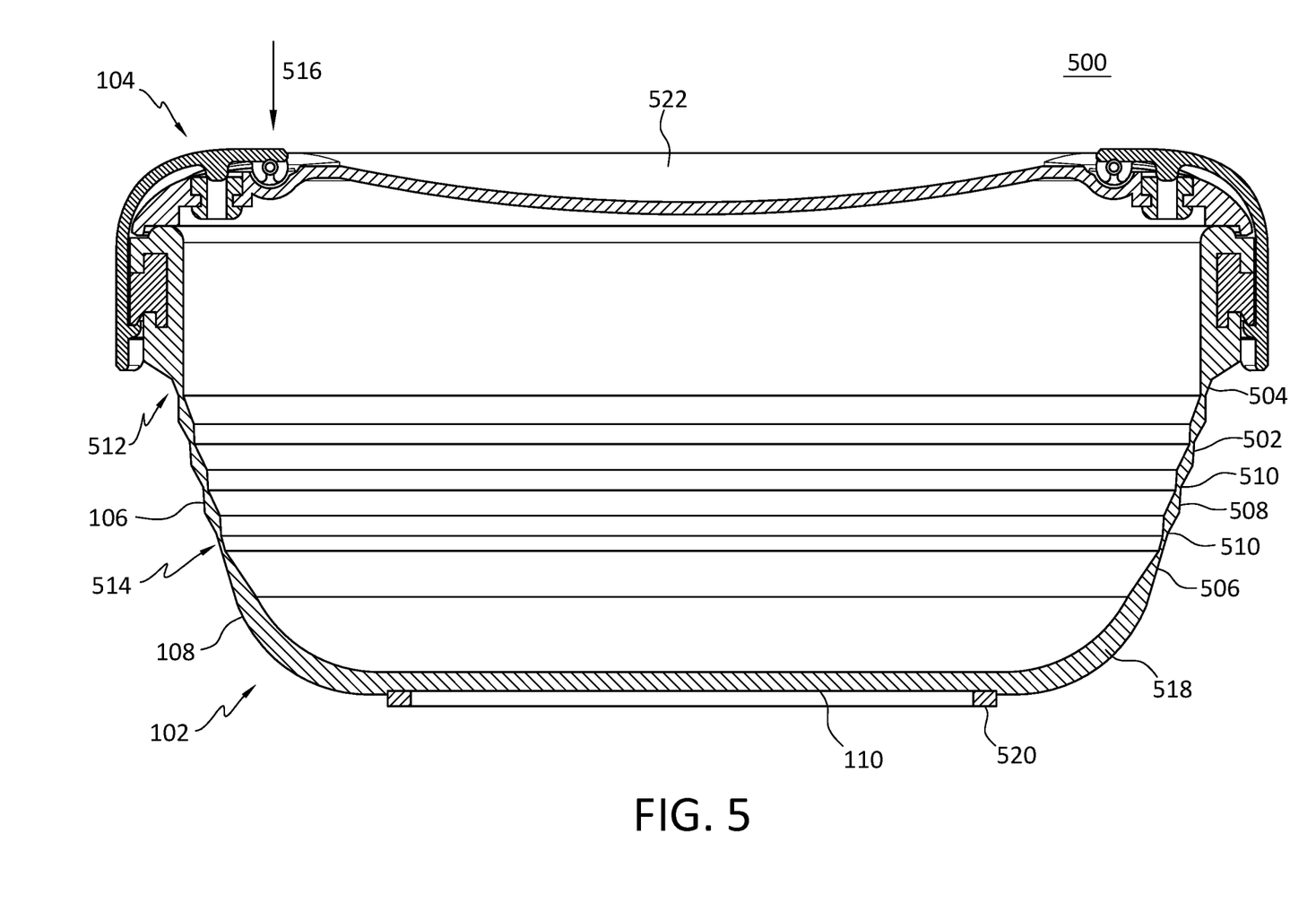
FIG. 5 is a cross sectional view of a flexible main body in an expanded state according to an embodiment disclosed herein.

FIG. 5 is a cross sectional view 500 of a collapsible food container 100 in an expanded state according to an embodiment disclosed herein. The upper portion 106 of the collapsible container 102 may include a plurality of minor stages 502 positioned in-between an upper articulating wall 504 and a lower articulating wall 506. Each of the plurality of minor stages 502 may have a generally diamond shape with a thick, inflexible center 508 and thin flexible longitudinal edges 510. Each of the plurality of minor stages 502 are connected to one another at their respective flexible longitudinal edges 510. The thick, inflexible center 508 provides for greater support while in the expanded state and the thin, flexible longitudinal edges 510 provide for greater flexibility while transitioning between the expanded and collapsed states.

The flexible longitudinal edges 510 allow each of the plurality of minor stages 502 to bend at its respective flexible longitudinal edge 510. Accordingly, the flexible longitudinal edges 510 allow each of the plurality of minor stages 502 to fold over a neighboring one of the plurality of minor stages 502 as the collapsible container 102 transitions between the expanded and collapsed states.

The upper articulating wall 504 may couple a first end 512 of the upper portion 106 to the seating wall 302. The upper articulating wall 504 is flexible in a manner as to bias the upper portion 106 into a portion of the inner space 112 defined by the seating wall 302 when a downward force 516, towards the lower portion 108, is applied to the lid assembly 104.

The lower articulating wall 506 may couple a second end 514 of the upper portion 106 to the lower portion 108, the second end 514 positioned opposite the first end 512. The lower articulating wall 506 is flexible in a manner as to bias the lower portion 108 into a portion of the inner space 112 defined by the upper portion 106 when the downward force 516 is applied to the lid assembly 104.

The upper articulating wall 504 and the lower articulating wall 506 are each sufficiently thin compared to the rest of the collapsible container 102 to ensure that they are the first to collapse when the downward force 516 is applied to the lid assembly 104.

The lower portion 108 may include a reinforcing element 518 embedded within a portion of the lower portion 108. The reinforcing element 518 may be rigid or semi-rigid to maintain the shape of the lower portion 108 while the downward force 516 is applied to the lid assembly 104. The reinforcing element 518 may be comprised of a thicker gauge of the same material comprising the collapsible container 102. The thicker portions of the collapsible container 102 having less flexibility than the remainder of the collapsible container 102.

The flat bottom portion 110 may include a foot ring 520 sized to fit within a center portion 522 on the outer surface 312B of the rigid lid 312 outside of the pair of latches 314. The foot ring 520 facilitates the stacking of multiple collapsible food containers 100 on top of one another.

Figure 6:
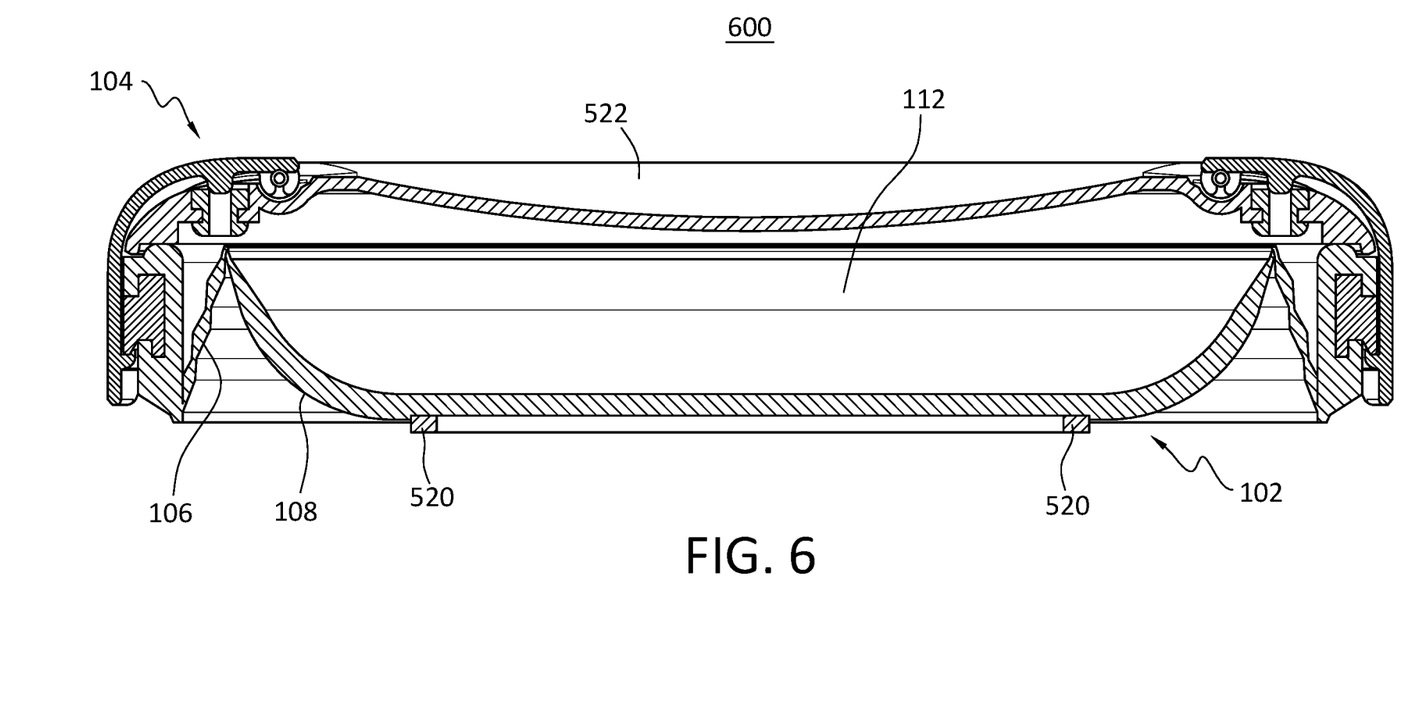
FIG. 6 is a cross sectional view of a flexible main body in a collapsed state according to an embodiment disclosed herein.

FIG. 6 is a cross sectional view 600 of a collapsible food container 100 in a collapsed state according to an embodiment disclosed herein. In the collapsed state, the upper portion 106 is positioned adjacent to the seating wall 302 and enveloped within a portion of the inner space 112 defined by the seating wall 302. Moreover, in the collapsed state, the lower portion 108 is positioned adjacent to the upper portion 106 and enveloped within a portion of the inner space defined by the seating wall 302. In the collapsed state, the second end 514 of the upper portion 106 is positioned adjacent to the lid assembly 104.

The foregoing description discloses only example embodiments of the invention. Modifications of the above-disclosed apparatus, systems, and methods that fall within the scope of the invention will be readily apparent to those of ordinary skill in the art. Accordingly, while the present invention has been disclosed in connection with an example embodiment, it should be understood that other embodiments may fall within the scope of the invention.

What is claimed is:

1. A collapsible food container, comprising:
   a collapsible container; and
   a lid assembly;
   the collapsible container including an upper portion, a lower portion, and a seating wall;
   the seating wall coupled to a first end of the upper portion and the lower portion coupled to a second end of the upper portion opposite the first end;
   an upper retaining ridge and a lower retaining ridge extending from the seating wall;
   a seating wall channel coupled to the seating wall positioned in between the upper retaining ridge and the lower retaining ridge;
   the upper portion being collapsible as to transition the collapsible container between an expanded state in which the collapsible container defines an inner space and a collapsed state in which the lower portion, the upper portion, and the seating wall are adjacent to one another;
   the lid assembly including a rigid lid and a rigid collar separate from the rigid lid, the rigid collar intactly embedding and separating from the seating wall channel; and
   the rigid lid removably coupling to the rigid collar while the rigid collar is embedded within the seating wall channel.

2. The collapsible food container of claim 1, wherein the collapsible container is tapered shaped.

3. The collapsible food container of claim 1, wherein the upper portion of the collapsible container is comprised of an upper articulating wall and a lower articulating wall that are coupled to one another by a plurality of minor stages.

4. The collapsible food container of claim 1, wherein the lower portion includes a flat bottom portion with a foot ring.

5. The collapsible food container of claim 1, further comprising
   an embossed channel embedded within the upper retaining ridge; and
   a raised profile extending from the rigid lid, the raised profile creating a leak-proof seal of the inner space when inserted into the embossed channel.

6. The collapsible food container of claim 1, wherein
   the rigid collar includes an upper ridge running along an upper perimeter of the rigid collar and aligning with the upper retaining ridge;
   the rigid collar includes a lower channel running along a lower perimeter of the rigid collar and aligning with the lower retaining ridge; and
   the rigid collar includes an upper wall running along the upper perimeter of the rigid collar and aligned with the seating wall channel.

7. The collapsible food container of claim 1, further comprising a reinforcing element embedded within the lower portion of the collapsible container.

8. A method for providing a collapsible food container, the method comprising:
   providing a collapsible container; and
   providing a lid assembly;
   the collapsible container including an upper portion, a lower portion, and a seating wall;
   the seating wall coupled to a first end of the upper portion and the lower portion coupled to a second end of the upper portion opposite the first end;
   providing an upper retaining ridge and a lower retaining ridge extending from the seating wall;
   providing a seating wall channel coupled to the seating wall positioned in between the upper retaining ridge and the lower retaining ridge;
   the upper portion being collapsible as to transition the collapsible container between an expanded state in which the collapsible container defines an inner space and a collapsed state in which the lower portion, the upper portion, and the seating wall are adjacent to one another;
   the lid assembly including a rigid lid and a rigid collar separate from the rigid lid, the rigid collar intactly embedding and separating from the seating wall channel; and
   the rigid lid removably coupling to the rigid collar while the rigid collar is embedded within the seating wall channel.

9. A collapsible food container, comprising:
   a collapsible container; and
   a lid assembly;
   the collapsible container including an upper portion, a lower portion, and a seating wall;
   the seating wall coupled to a first end of the upper portion and the lower portion coupled to a second end of the upper portion opposite the first end;
   an upper retaining ridge and a lower retaining ridge extending from the seating wall;
   a seating wall channel coupled to the seating wall positioned in between the upper retaining ridge and the lower retaining ridge;
   the upper portion being collapsible as to transition the collapsible container between an expanded state in which the collapsible container defines an inner space and a collapsed state in which the lower portion, the upper portion, and the seating wall are adjacent to one another;

the lid assembly including a rigid lid and a rigid collar separate from the rigid lid, the rigid collar intactly embedding and separating from the seating wall channel; and the rigid lid removably coupling to the rigid collar while the rigid collar is embedded within the seating wall channel;

a pair of latches rotatably coupled to the rigid lid and capable of removably coupling to the rigid collar;

compression valves embedded within the rigid lid and positioned under each of the pair of latches;

a hole through each of the compression valves;

a circular protrusion extending from an underside of each of the pair of latches and positioned to align with the hole of each of the compression valves; and the compression valves creating an airtight seal within the inner space while the pair of latches are removably coupled to the rigid collar.

10. The collapsible food container of claim 9, wherein the pair of latches and the compression valves are removable from the rigid lid.

11. The collapsible food container of claim 9, wherein the rigid lid has a center portion positioned outside of the pair of latches.

* * * * *